United States Patent
Nishimura

Patent Number: 6,094,217
Date of Patent: *Jul. 25, 2000

[54] AUTOMATIC REGENERATING METHOD FOR FILM IMAGE

[75] Inventor: Toru Nishimura, Asaka, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/549,189

[22] Filed: Oct. 27, 1995

[30] Foreign Application Priority Data

Oct. 27, 1994 [JP] Japan .................................. 6-263777

[51] Int. Cl.⁷ ...................................................... H04N 7/18
[52] U.S. Cl. ............................... 348/96; 348/97; 348/103
[58] Field of Search ................................ 348/96, 97, 104, 348/103, 105, 110, 111, 112; 396/311, 429; 355/40, 27, 41

[56] References Cited

U.S. PATENT DOCUMENTS

| | | | |
|---|---|---|---|
| 4,763,186 | 8/1988 | Belmares-Sarabia | 358/22 |
| 4,862,200 | 8/1989 | Hicks | 354/75 |
| 5,206,929 | 4/1993 | Langford et al. | 395/159 |
| 5,293,208 | 3/1994 | Okano et al. | 355/55 |
| 5,317,364 | 5/1994 | Fields | 355/40 |
| 5,333,033 | 7/1994 | Blackman | 355/27 |
| 5,382,508 | 1/1995 | Ikenoue | 430/496 |
| 5,412,773 | 5/1995 | Carlucci et al. | 348/156 |
| 5,420,699 | 5/1995 | Yamanouchi et al. | 358/487 |
| 5,457,491 | 10/1995 | Mowry | 348/104 |
| 5,526,078 | 6/1996 | Itoh et al. | 354/106 |
| 5,541,644 | 7/1996 | Nanba | 348/96 |
| 5,546,122 | 8/1996 | Asami et al. | 348/96 |
| 5,623,303 | 4/1997 | Inoue et al. | 348/96 |
| 5,633,977 | 5/1997 | Inoue et al. | 348/96 |
| 5,652,643 | 7/1997 | Saito et al. | 396/311 |
| 5,657,074 | 8/1997 | Ishibe et al. | 348/96 |
| 5,742,334 | 4/1998 | Yagura et al. | 348/96 |
| 5,825,410 | 10/1998 | Ishibe et al. | 348/97 |
| 5,838,364 | 11/1998 | Ishibe et al. | 348/96 |

FOREIGN PATENT DOCUMENTS

| | | |
|---|---|---|
| 4-223454 | 8/1992 | Japan . |
| 5-19359 | 1/1993 | Japan . |
| WO9004301 | 4/1990 | WIPO . |

*Primary Examiner*—Andy Rao

[57] ABSTRACT

A developed photographic film including a magnetic layer is transported up to an image reading part so as to read a film image thereon. The film images are sequentially displayed on a TV monitor in accordance with automatic regenerating information. The automatic regenerating information is previously input as information used for sequentially and automatically regenerating a plurality of the film images. Moreover, magnetic information is used as a part of the automatic regenerating information. This magnetic information is recorded in the magnetic layer by a camera at the time of photographing. As a result, an operation is simplified at the time of inputting the automatic regenerating information.

21 Claims, 15 Drawing Sheets

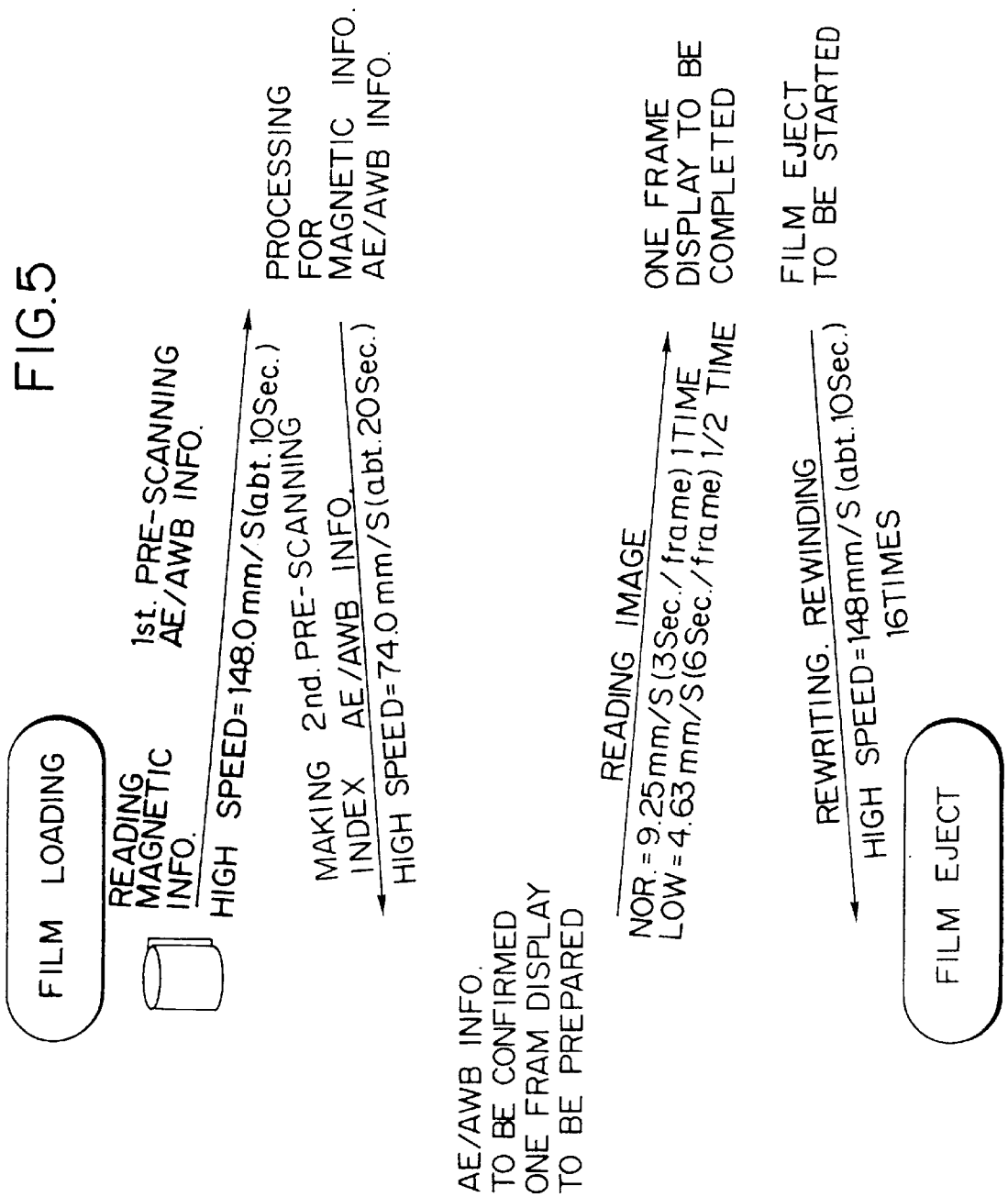

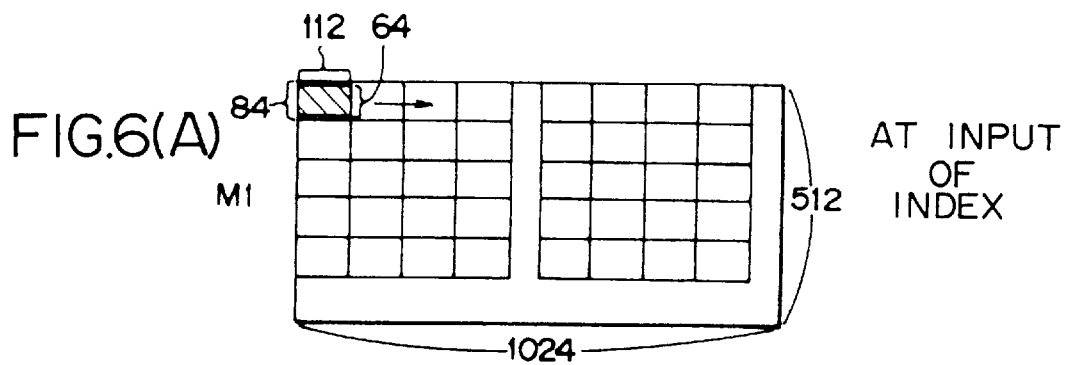
FIG.6(A) AT INPUT OF INDEX
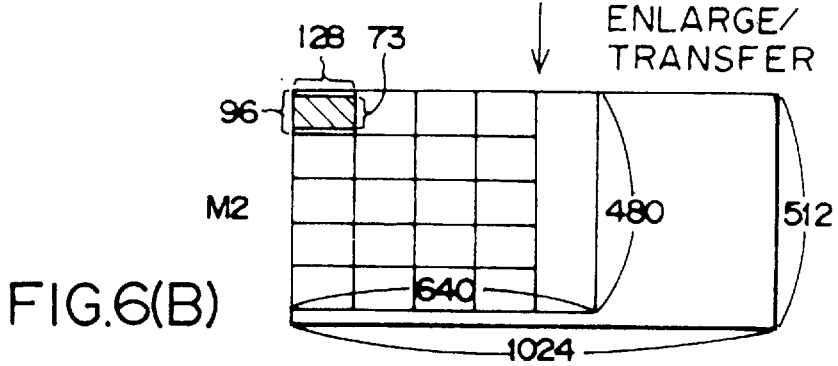
FIG.6(B) ENLARGE/TRANSFER
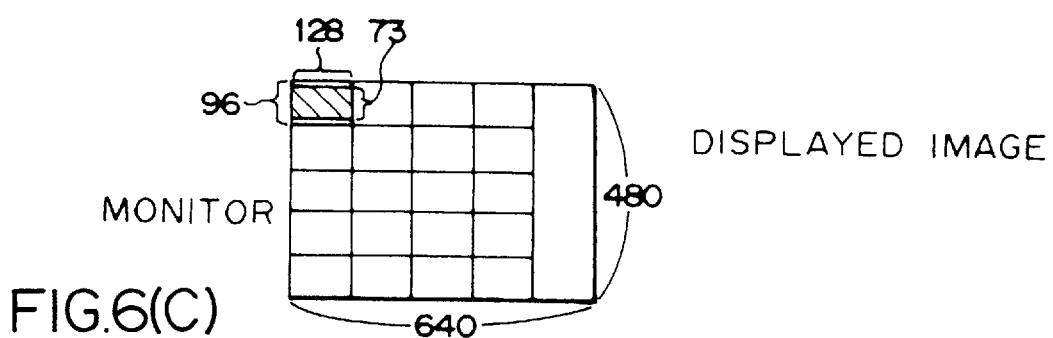
FIG.6(C) DISPLAYED IMAGE MONITOR
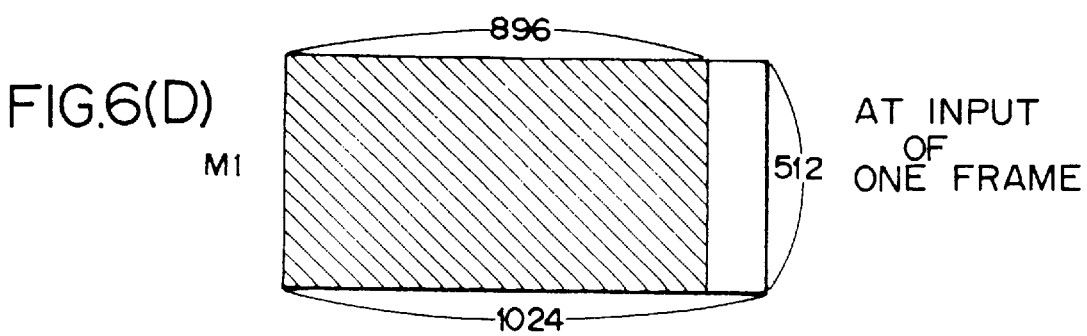
FIG.6(D) AT INPUT OF ONE FRAME

| 1 SKIP | 2 | 3 | 4 | P S E T |
|---|---|---|---|---|
| 5 | 6 | 7 | 8 | R O T S |
| 9 | 10 | 11 | 12 | SKPS |
| 13 | 14 | 15 | 16 | V I E W |
| 17 | 18 | 19 | 20 | P L A Y |
| | | | | E N V |
| | | | | E N D |

| 1 ⇧ | 2 | 3 | 4 | P S E T |
|---|---|---|---|---|
| 5 | 6 | 7 | 8 | ROTS |
| 9 | 10 | 11 | 12 | S K P S |
| 13 | 14 | 15 | 16 | V I E W |
| 17 | 18 | 19 | 20 | P L A Y |
|   |   |   |   | E N V |
|   |   |   |   | E N D |

FIG.9

| 1<br>3 | 2<br>5 | 3<br>0 | 4<br>0 | |
|---|---|---|---|---|
| 5<br>2 | 6<br>1 | 7<br>2 | 8<br>3 | PSET |
| 9<br>0 | 10<br>1 | 11<br>0 | 12<br>1 | ROTS<br>SKPS |
| 13<br>0 | 14<br>0 | 15<br>2 | 16<br>3 | VIEW<br>PLAY |
| 17<br>1 | 18<br>4 | 19<br>0 | 20<br>1 | ENV<br>END |

FIG.12

| 1 | 2 | 5 | 6 | PRINT TOTAL |
|---|---|---|---|---|
| 3 | 5 | 2 | 1 | 29 |
| 7 | 8 | 10 | 12 | |
| 2 | 3 | 1 | 1 | |
| 15 | 16 | 17 | 18 | |
| 2 | 3 | 1 | 4 | |
| 20 | | | | |
| 1 | | | | |
| | | | | |

FIG.14

| 1   3 | 2   5 | 3 | 4 | PRINT TOTAL |
|---|---|---|---|---|
| 5   2 | 6   1 | 7   2 | 8   3 | 29 |
| 9 | 10   1 | 11 | 12   1 | |
| 13 | 14 | 15   2 | 16   3 | |
| 17   1 | 18   4 | 19 | 20   1 | |

AUTOMATIC REGENERATING METHOD FOR FILM IMAGE

BACKGROUND OF THE INVENTION

1. Field of the Invention

The present invention relates to an automatic regenerating method for a film image and more particularly to an automatic regenerating method for sequentially regenerating a plurality of film images in a roll of film and displaying the images on a TV monitor.

2. Description of the Related Art

In methods of Japanese Patent Application Laid-open No. 4-223454 and No. 5-19359, information relating to aspect ratio (print format), zooming magnification, trimming and the like of an image plane is recorded in a magnetic layer of a film at or after photographing, and this information is used for making a photographic print. Moreover, there is a method of recording optical information relating to the print format, etc. in the film except for the frame area so as to use this optical information for making a photographic print.

Moreover, in WO90/04301 and the like, a film player has been well known that picks up a developed still photographic film by an image sensor such as CCD and converts an image of the film into image signal so as to display the image on a TV monitor.

Here, it is possible to think out an automatic regenerating method for a film image which displays a plurality of film images in a roll of film sequentially and automatically by means of a film player. In this case, however, users have to input information which is required for sequentially and automatically regenerating the plurality of film images in a roll of a film. Therefore, there is a problem in that it takes much time for the users to input the information.

Moreover, it is possible to rewrite the magnetic information which is recorded in the film or to record the magnetic information after photographing. However, there is a case when the contents of the magnetic information is different from that of the optical information. Accordingly, a countermeasure is required for this case.

Furthermore, it is possible to record print information as magnetic information, which instructs to print a predetermined film image among plural images in one roll of film. In this case, it is necessary to confirm which film image is instructed to be printed, the number of prints, and the like.

SUMMARY OF THE INVENTION

The present invention has been developed in view of the above-described circumstances and has as its aim the provision of an automatic regenerating method for a film image capable of sequentially and automatically regenerating a plurality of film images in a roll of film so as to display the image on a TV monitor and decreasing users' trouble at the time of inputting information relating to the automatic regeneration.

It is another object of the present invention to provide an automatic regenerating method for a film image which can realize a desirable automatic regeneration even if contents of the optical information of the film is different from the magnetic information of the film.

It is yet another object of the present invention to provide an automatic regenerating method for a film image which enables an user to review a frame image instructed to be printed among plural images in one roll of film.

To achieve the above-mentioned object, an automatic regenerating method for a film image of the present invention wherein a developed photographic film is transported up to an image reading part, the film includes a plurality of film images, the plurality of film images of the film is read out, and the read-out film image is displayed on a TV monitor in accordance with automatic regenerating information used for sequentially and automatically regenerating the plurality of film images, comprises the steps of, reading out information, and using the read-out information as a part of the automatic regenerating information. Here, the information is recorded in the photographic film by a camera at the time of photographing or is recorded in the photographic film anywhere except for a frame area by a manufacturer. Moreover, it is possible to record magnetic information relating to at least one of a photographing date/time, a size of a main subject, a position of a main subject, and a print format in the magnetic layer and to use the magnetic information as the automatic regenerating information in order to perform an automatic regeneration effectively. As a result, users' trouble can be decreased at the time of inputting information relating to the automatic regeneration which is useful for performing the automatic regeneration effectively.

In order to achieve the above-mentioned object, an automatic regenerating method for a film image of one embodiment of the present invention wherein a developed photographic film is transported up to an image reading part, the film includes a plurality of film images and a magnetic layer, the plurality of film images of the film is read out, the read-out film image is displayed on a TV monitor in accordance with automatic regenerating information used for sequentially and automatically regenerating the plurality of film images comprises the steps of, recording automatic regenerating information in the magnetic layer as magnetic information, recording automatic regenerating information in the photographic film except for a frame area as optical information, selecting one of the magnetic information or the optical information by a mode selector, and using only information selected by the mode selector, as the automatic regenerating information at the time of regenerating. The mode selector selects one of the magnetic information and the optical information in accordance with users' instruction. As a result, it is possible for the user to freely select the magnetic information and the optical information.

Further, in order to achieve the above-mentioned object, an automatic regenerating method for a film image of another embodiment of the present invention wherein a developed photographic film is transported up to an image reading part, the film includes a plurality of film images and a magnetic layer, the plurality of film images of the film is read out, the read-out film image is displayed on a TV monitor in accordance with automatic regenerating information used for sequentially and automatically regenerating the plurality of film images comprises the steps of, recording automatic regenerating information in the magnetic layer as magnetic information, recording automatic regenerating information in the photographic film except for a frame area as optical information, invalidating the optical information in accordance with an instruction of invalidity instructing unit, and recording information indicating that the optical information is invalidated in the magnetic layer. The invalidating instruction unit instructs to invalidate the optical information so that the invalidated information should not be used as the automatic regenerating information. Here, it is possible to record the optical information as the magnetic information in accordance with an instruction of a convert instructing unit. The convert instructing unit instructs to record an indication of the optical information as the magnetic information in the magnetic layer of the film. As a result, a desirable automatic regenerating can be carried out in the case that the contents of the optical information is different from that of the magnetic information.

Furthermore, in order to achieve the above-mentioned object, an automatic regenerating method for a film image of the other embodiment of the present invention wherein a developed photographic film is transported up to an image reading part, the film includes a plurality of film images and a magnetic layer, the plurality of film images of the film is read out, and the read out film image is displayed on a TV monitor in accordance with automatic regenerating information used for sequentially and automatically regenerating the plurality of film images, comprises the steps of reading out a print information from the magnetic layer of the film, and automatically regenerating only the film image being instructed to be printed by the print information. The print information is previously recorded in the magnetic layer of the film, and the print information instructs a film image to be printed. Moreover, an automatic regenerating method for a film image, a developed photographic film is transported up to an image reading part, the film includes a plurality of film images and a magnetic layer, the plurality of film images of the film is read out, an index image is made in such a manner to include a plurality of frames corresponding to the plurality of film images, and the index image is displayed on a TV monitor comprises the steps of reading out a print information from the magnetic layer of the film, and displaying the index image in such a manner that frames of the index image for the film images being instructed to be printed and frames of the index image for film images not being instructed to be printed are appeared to be different from each other. The print information is previously recorded in the magnetic layer of the film, and the print information instructs a film image to be printed. As a result, an user can easily review a frame image instructed to be printed among plural images in one roll of film.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIG. 5 is a view showing one example of a sequence of the film conveyance in the film player of FIG. 1;

FIGS. 6(A), 6(B), 6(C) and 6(D) are views showing storage regions of CCD buffer and a display buffer in the film player of FIG. 1, and a display screen of the TV monitor;

FIG. 9 is a view explaining the designation of the print number for each frame;

FIG. 12 is a view showing an index image which is made in accordance with the procedure of the flow chart of FIG. 11;

FIG. 14 is a view showing an index image which is made in accordance with the procedure of the flow chart of FIG. 13;

DESCRIPTION OF THE PREFERRED EMBODIMENT

Detailed description will hereunder be given of the preferred embodiment of a film image input method according to the present invention with reference to the accompanying drawings.

Figure 1:
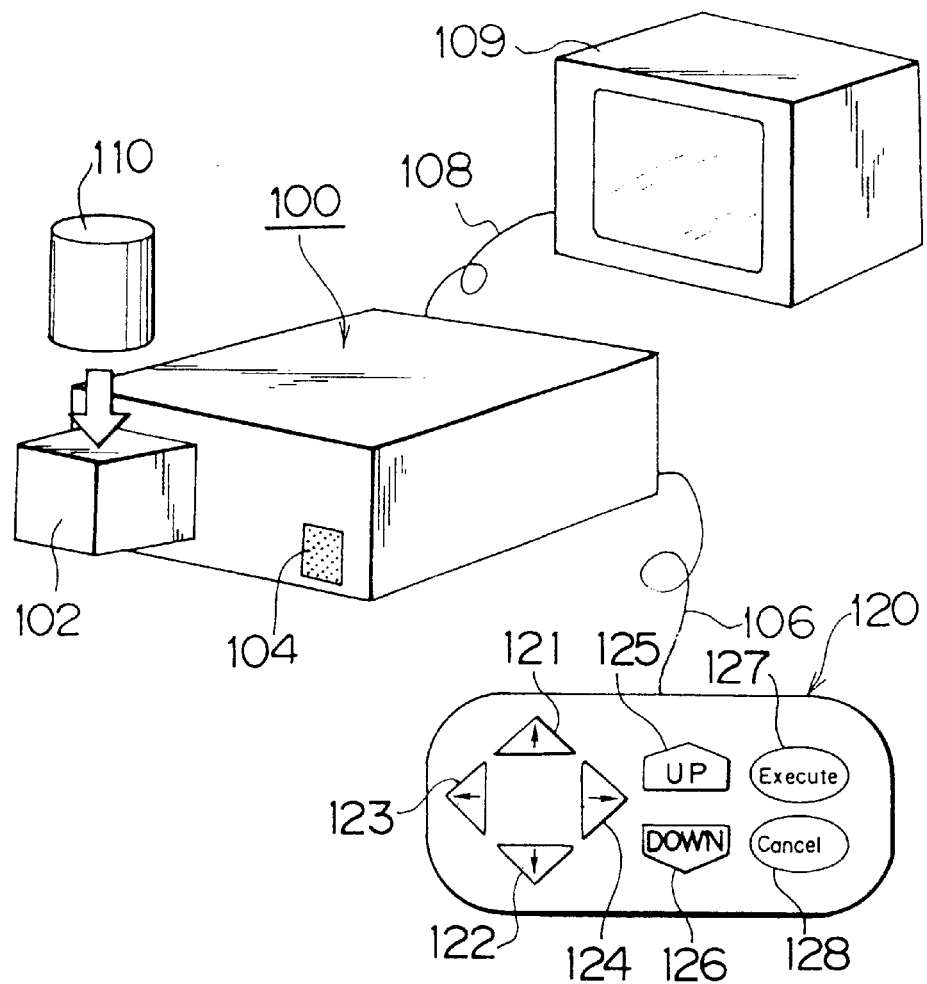
FIG. 1 is a perspective view showing the entire structure of a system including a film player applying the automatic regenerating method for a film image according to the present invention.

FIG. 1 is a view showing the entire structure of a system including a film player which applies an automatic regenerating method for a film image according to the present invention. As shown in FIG. 1, the film player 100 has a rectangular-parallelepiped shape, and a film cartridge tray 102 and a power source switch 104 are provided on the front surface of the film player 100. The film cartridge tray 102 is moved forward and backward for loading/unloading a film cartridge 110, and the film cartridge 110 is stored in or ejected out of the film cartridge tray 102.

A key pad 120 and a TV monitor 109 are connected to the film player 100, and different kinds of operation signals are input from the key pad 120 to the film player 100 via a cable 106 so as to control the film player 100. A video signal is sent from the film player 100 to the TV monitor 109 via a cable 108. A detailed explanation will be given of the key pad 120 for controlling the film player 100.

Figure 2:
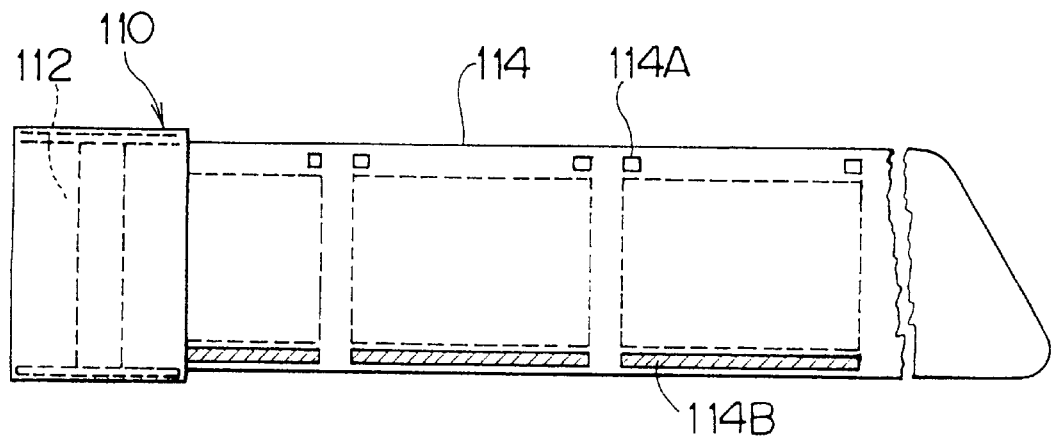
FIG. 2 is a view showing one example of the film cartridge used in the film player of FIG. 1.

The film cartridge 100 has a single spool 112 as shown in FIG. 2, and a photographic film 114 is wound around the spool 112. In the photographic film 114, a perforation 114A is provided indicating a position of each frame, and a magnetic layer 114B is formed on the entire surface or the edge of the film. The magnetic data, which indicates the photographing data of each frame, etc., can be recorded in the magnetic record layer 114B by a camera including a magnetic head. The photographic film 114 is wound into and housed in the film cartridge 110 after a development.

The camera using the film cartridge 110 is able to record different kinds of the magnetic data of each frame in the magnetic record layer 114B of the film 114 by the magnetic head housed in the camera. The magnetic data to be recorded is, for example, frame numbers, a print format indicating one type of a high-vision image, a panoramic image or an ordinary image, the date/time of photographing, a position of a subject in an image plane, a subject distance, a correct direction of an image etc. Many kinds of other data can be stored in accordance with a performance of the camera. Further, a type of a film, a bar code indicating frame numbers, the data which indicates the print format, etc. can be optically stored in the photographic film 14 except for frames exposed by an object light with a light source housed in the camera at the time of photographing.

Figure 3:
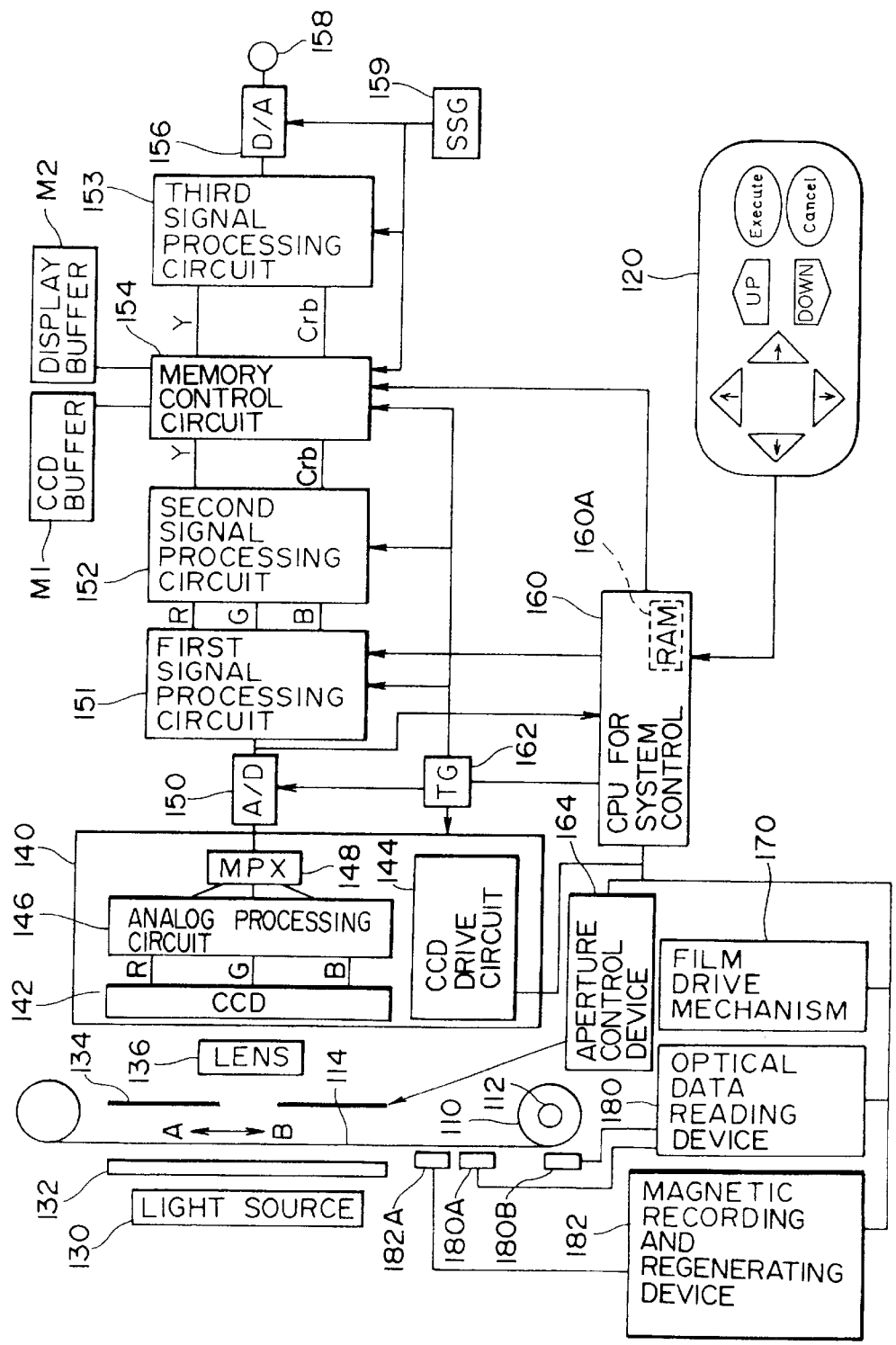
FIG. 3 is a block diagram showing one embodiment of the inner structure of the film player of FIG. 1.

FIG. 3 is a block diagram showing one embodiment of the inner structure of the film player 100. The film player 100 mainly comprises a light source 130 for illumination, a taking lens 136, a CCD circuit unit 140 including a CCD line censor 142, a first signal processing circuit 151, a second signal processing circuit 152, a third signal processing circuit 153, a memory control circuit 154, a CCD buffer M1, a display buffer M2, a central processing unit (CPU) 160, a film drive mechanism 170, an optical data reading device 180, a magnetic recording and regenerating device 182 for magnetic data, and so forth.

The light source 130 is a fluorescent light which stretches in the direction perpendicular to a direction of a film transport, for example, and illuminates the film 114 through an infrared cutting filter 132. An image light transmitted through the film 114 is formed on a light-accepting surface of the CCD line sensor 142 through the taking lens 136. Incidentally, while the CCD line sensor 142 is picking up the film image, the film 114 is transported at a fixed speed by the film drive mechanism 170 in the direction of an arrow A (a forward direction) or the direction of an arrow B (a backward direction). A detailed explanation of the film transport will be given later.

The CCD line sensor 142 is provided in the direction perpendicular to the film transport direction. The image light formed on the light-accepting surface of the CCD line sensor 142 is charged for a predetermined period of time in each sensor, which has R, G and B filters, and is converted into signal charge R, G and B corresponding to a light strength respectively. The signal charge is sent to a shift register by a lead gate pulse of a predetermined cycle, which is transmitted from the CCD drive circuit 144, and sequentially read out from the CCD line sensor 142 by a register transfer pulse.

Incidentally, the CCD line sensor 142 has a sensor of 1024 picture elements, for example, in the direction perpendicular to the film transport direction. In the case that the cycle of the lead gate pulse, etc. of the CCD drive circuit 144 are not changed, the number of picture elements in the same direction as the film transport direction of one frame changes according to the film transport speed, and when the film feed speed is ½, 1, 8, 16 times as fast as that in the case when the standard film image is picked up, the number of picture elements is 1792, 896, 112, and 56 respectively. The signal charge is read out from the CCD line sensor 142 in the above-mentioned way. Then, the signal charge is cramped by a CDS cramp and sent to an analog processing circuit 146 as R, G and B signals, A gain, etc. of the R, G and B signals are controlled in the analog processing circuit 146. The multiplexer 148 receives R, G and B signals from the analog processing circuit 146 and dot-sequentially transmits them to the A/D converter 150. The R, G and B signals are converted into digital signals by the A/D converter 150, and then transmitted to the first signal processing circuit 151 and the CPU 160.

The first signal processing circuit 151 includes a white-balance adjustment circuit, a negative-positive inversion circuit, a γ-correction circuit, a RGB circuit which transmits R, G and B signals simultaneously, and so forth. The input dot-sequential R, G and B signals are signal-processed in each circuit of the circuit 151 and sent to the second signal processing circuit 152. Incidentally, the white-balance adjustment circuit in the first signal processing circuit 151 carries out the white-balance in accordance with the control signal transmitted from the CPU 160, and a detailed explanation on it will be given later.

The second signal processing circuit 152 including a matrix circuit produces a luminance signal Y and a chroma signal Cr/b in accordance with the input R, G and B signals, and sends them to the memory control circuit 154.

The memory control circuit 154 controls writing in/reading out the luminance signal Y and the chroma signal Cr/b from the CCD buffer M1, and also controls the transmission of the luminance signal Y and the chroma signal Cr/b between the CCD buffer M1 and the display buffer M2. Incidentally, the detailed explanation will be given later of the CCD buffer M1 and the control of the writing/reading in the display buffer M2. The memory control circuit 154 reads out the luminance signal Y and the chroma signal Cr/b from the display buffer M2 and sends them to the third signal processing circuit 153.

The third signal processing circuit 153 produces a color composite video signal of NTSC system, for example, in accordance with the luminance signal Y and the chroma signal Cr/b and transmits the video signal to a video output terminal 158 via the D/A convertor. Incidentally, the synchronizing signal having a predetermined cycle is transmitted to the memory control circuit 154, the third signal processing circuit 153 and the D/A converter 156 by a synchronizing signal generator 159. As a result, each of the circuits can be synchronized and the video signal including predetermined synchronizing signal can be obtained. Also, a timing signal generator 162 controlled by the CPU 160 transmits a timing signal to the CCD circuit unit 140, the A/D converter, the first signal processing circuit 151, the second signal processing circuit 152 and the memory control circuit 154, so that each circuit can be synchronized.

The film drive mechanism 170 comprises a film supplying part rotating the spool 112 forward/backward, a film winding part winding the film 114 which is sent from the film supplying part, a means for transporting the film 114 through and between a capstan and a pinch roller at a fixed speed, which is provided in a film transport path. The spool 112 of the film cartridge 110 is connected with the spool 112 of the film supplying part. Incidentally, the film supplying part rotates the spool 112 of the film cartridge 110 clockwise in FIG. 3, and transport the film 114 from the film cartridge 110 until the forward end of the film is wound up by the film winding part.

An optical data reading device 180 includes a first optical sensor 180A for optically detecting a perforation 114A of the film 114, and a second optical sensor 180B which optically reads the optical data in a bar code, etc. provided in the edge of the film, and signal-processes the optical data detected by these optical sensors 180A and 180B and transmits them to the CPU 160.

The magnetic recording and regenerating device 182 having a magnetic head 182A reads out magnetic data recorded in the magnetic layer 114B of the film 114 with the magnetic head 182A. The device 182 processes the magnetic data to send them to the CPU 160 and stores them in a RAM 160A. Also, the device 182 reads out the data stored in the RAM 160A of the CPU 160 and converts them into appropriate signals for a magnetic recording. Then, the device 182 transmits the data to the magnetic head 182A so as to record them in the magnetic record layer 114B of the film 114.

Next, an explanation will be given of the operation of the film player 100 structured as mentioned above with reference to a flow chart of FIG. 4.

First, when the film cartridge 110 is set in the film cartridge tray 102, the CPU 160 controls the film drive mechanism 170 so as to carry out the film-loading (Step 200). That is, the film 114 is sent out from the film cartridge 110, and the forward end of the film 114 is wound around a winding axis of the film winding part.

When the film-loading is completed, the first pre-scanning of the film 114 is carried out (Step 202). That is, as shown in FIG. 5, the film 114 is transported in the forward direction at a high speed of 148.0 mm/s. When this first pre-scanning is performed, the image data is picked up by the CCD line sensor 142, and the optical data and the magnetic data are read out by the optical data reading device 180 and the magnetic recording and regenerating device 182.

Next, an explanation will be given of the processing in accordance with the image data which is picked up when the above-mentioned first pre-scanning is carried out.

The dot-sequential R, G and B signals are sent from the A/D converter 150 shown in FIG. 3 to the CPU 160. The CPU 160 receives the signals R, G and B of all frames respectively, and calculates offset value and gain to adjust the white-balance for respective R, G and B signals. Then, CPU 160 stores offset data indicating the offset value and AWB data indicating the gain for each frame in a random access memory (RAM) 160A provided therein. Also, the CPU 160 stores AE data indicating the brightness of each frame, which are included in R, G and B signals, in the RAM 160A. The CPU 160 detects each frame on the film 114 in accordance with the optical data and/or magnetic data which is transmitted from the optical data reading device 180 and/or the magnetic recording and regenerating device 182. The CPU 160 also detects frame numbers by counting each frame.

Next, the second pre-scanning of the film 114 is performed. That is, as shown in FIG. 5, the film 114 is transported in the backward direction at a high speed of 74.0 mm/s. When the second pre-scanning is performed, the image data is picked up by the CCD line sensor 142 again. When the image data is picked up, the CPU 160 controls an aperture control device 164 so as to adjust an aperture 134 for each frame in accordance with the AE data stored in the RAM 160A.

Incidentally, in the case that the CCD line sensor 142 includes an electronic shutter mechanism, the CCD drive circuit 144 adjusts the exposure amount by controlling time for charging in the CCD line sensor 142. As a result, the aperture 134 and an aperture control unit 164 are not required.

The CPU 160 makes the first signal processing circuit 151 adjust the offset and the white balance of the signals R, G and B for each frame. That is, the CPU 160 sends the offset data of the respective R, G and B signals in each frame to the first signal processing circuit 151, which adjusts the offset of the dot sequential signals R, G and B in accordance with the offset data. Similarly, the CPU 160 sends the AWB data of respective R, G and B signals in each frame, which is stored in the RAM 160A, to the first signal processing circuit 151. The circuit 151 adjusts the gain of the dot-sequential signals R, G and B in accordance with the AWB data.

The image data in each frame is adjusted according to the AE data, the AWB data, etc., so that the high-quality image data can be picked up regardless of photographing conditions in each frame.

The adjusted image data in each frame, that is, the luminance signal Y and the chroma signal Cr/b which are transmitted from the second signal processing circuit 152 are sequentially stored in the CCD buffer M1 by the memory control circuit 154. As described above, the film 114 is transported at a speed which is eight times as fast as the transport speed in the case when the normal film image is picked up. Therefore, the number of picture elements in the same direction as the film transport direction of one frame is 112 as shown in FIG. 6(A). The CCD line sensor 142 has a sensor of 1024 picture elements in the direction perpendicular to the film transport direction as mentioned previously. In this case, the picture elements are thinned out to be 1/16 of 1024 picture elements, therefore, the number of picture elements in the direction perpendicular to the film transport direction of one frame is 64. And, the CCD buffer M1 has a storage capacity for storing the data of 512×1024 picture elements as shown in FIG. 6(A), so it can store the image data of 5×4×2(=40) frames. That is, the image data showing the index image of 40 frames are stored in the CCD buffer memory.

The display buffer M2 has a capacity for storing the data of 512×1024 picture elements as shown in FIG. 6(B). When the image data showing the index image is stored in the display buffer M2, the image data of 5×4×2(=40) frames is stored in a state that the picture elements of each frame are thinned out to be 73×128. When the index image is displayed on the TV monitor 109, the region of 480×640 picture elements at the upper left of the display buffer M2 is read out (refer to FIGS. 6(B) and 6(C)).

In the CCD buffer M1, the image data of each frame is sequentially stored from the upper left toward the right side in the storage region according to the order that the image data of each frame are read at the time of the above-described scanning. When the image data of four frames are stored, the image data are sequentially stored from the left to the right in the storage region one line below. Then, when the image data of five lines (4×5=20 frames) are stored, the image data are also stored in the next storage region of twenty frames.

While the image data are stored in the CCD buffer M1 as mentioned above, the data stored in the CCD buffer M1 are transmitted to the display buffer M2.

Because the display buffer M2 can store the image data for only twenty (20) frames at a time, when the CCD buffer M1 receives the image data of the twenty-first frame, the image data in the display buffer M2 are rewritten and read in such a manner that the index image can be scrolled in the upward direction. For example, when the CCD buffer M1 receives the image data of the twenty-first frame, the image data of the frame No. 1 to No. 4 stored in one line of the storage region of the display buffer M2 is cleared, and the image data in the twenty-first frame is written, and the address for the start of the scanning at an output of the video signal is changed to the second line. As a result, the index image, which has been scrolled in the upward direction by one line, is displayed on the TV monitor 109. In this way, the image data of all the frames are stored in the CCD buffer M1. And, on the TV monitor 109, the screen is scrolled in the downward direction or changed over so that the image of frames No. 1–No. 20 can be displayed again.

The CPU 160 designates each frame to be No. 1, No. 2 ··· according to the order that the image data of each frame are read out at the time of the scanning and outputs a character signal indicating a frame number of each frame. As a result, frame numbers are superimposed on the index image.

When the index image is made as described above and the index image is displayed on the TV monitor 109, it is judged whether or not the automatic regeneration is selected by a key operation etc.(Step 203). In the case that the automatic regeneration is not selected, an user inputs information required to regenerate a desired image (Hereinafter refereed to "automatic regenerating information") on the TV monitor 109, by using the key pad 120 while watching the index image (Step 204).

Here, a lot of examples can be considered as the automatic regeneration information. In order to carry out the automatic regeneration effectively, it is preferred to use information relating to following items.

<Information used for performing automatic regeneration effectively>

"Length and breadth of a frame"

This information is used for instructing the top-bottom and right-left of an image, so that a regenerated image can be correctly positioned on a monitor.

"Letter"

This information relates to letters provided with each frame and/or a film as a whole in accordance with users' desire.

"Date and time"

This information relates to the date and time of photographing of each frame.

"Regenerated range"

This information relates to designation of a range to be regenerated on the monitor within one frame.

"Color Correction"

This information is manually set for designating luminance, color, color density, contrast and sharpness of each frame.

"Close-up"

This information relates to zooming magnification and a central position for enlargement.

"Automatic zooming"

This information relates to magnification at a start of zooming, that at an end of zooming and time for zooming.

"Switching screen"

This information relates to designation of a method for switching frames on screen, for example, switching frames immediately, scroll in/out, fade in/out, overlap, wipe in/out, and time (sec.) for these switching.

"Movement in Screen"

This information relates to the scanning within a screen for one frame (pan and tilting) and time required therefor.

"Display time"

This information relates to the time (sec.) for displaying each frame.

"Sound"

This instruction relates to kind of music played at the time of automatic regeneration (to be instructed for each frame or a film as a whole).

"Instruction of letters to be displayed"

This information relates to display/non-display of a title, the date and time and the like, and a display color and a display position of letters.

Additionally, other information can be considered, which relates to following items.

"Automatic color correction"

This information is automatically set at the time of prescanning and relates to the previously-mentioned AE and ALB data.

Moreover, it is possible to control automatic regeneration with information relating to following items.

<Information relating to the control of automatic regeneration>

"First frame"

This information relates to a frame number regenerated at first at the time of automatic display.

"End frame"

This information relates to a frame number regenerated at last at the time of automatic display.

"Next frame"

This information relates to a frame number regenerated next to a frame presently regenerated at the time of the automatic regeneration.

"Non-regenerated frame"

This information relates to instruction of a frame number which is not regenerated at the time of automatic display, or this information is provided for each frame to indicate whether or not a frame is regenerated.

It is possible to input the above-described information interactively with the key pad 120 of FIG. 1.

That is, the key pad 120 is composed of arrows keys 121, 122, 123 and 124,(→, ←, ↑, ↓), an "UP" key 125, a "DOWN" key 126, an "Execute" key 127 and a "Cancel" key 128 as shown in FIG. 1.

Figures 7A, 7B:
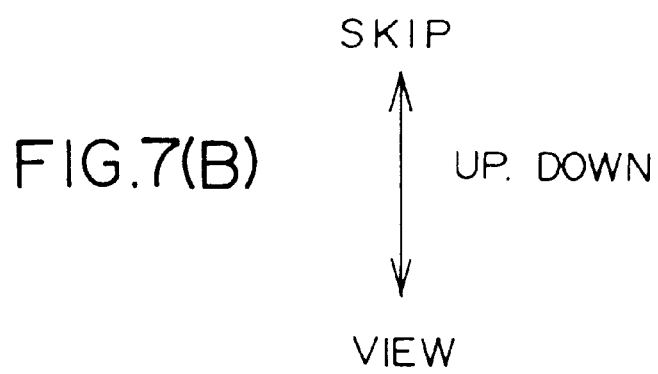
FIGS. 7(A) and 7(B) are views explaining the procedure of the skip designation command on the index image.

The CPU 160 displays the index image for twenty (20) frames and control menu on the TV monitor 109 as shown in FIG. 7. For example, the menu comprises following commands, that is, "PSET" for designating a print number, "ROTS" for designating the length and breadth of a frame, "SKPS" for designating the frames not to be displayed at the time of the regeneration, "VIEW" for regenerating frames one by one, "PLAY" for regenerating each frame sequentially at the fixed intervals, "ENV" for designating an environment such as the interval time and the background color, and "END" means that the editing by using the index image is over.

In order to select a command within the menu, a user moves a cursor to a position of the desired command with the "UP" and "DOWN" keys 125 and 126 of the key pad 120 and pushes the "Execute" key 127. Incidentally, the selected command is distinguished from others with a background color and the like. When the command is selected, the first frame is a frame to be edited, and the frame number of the first frame is displayed with blinking. The user operates the arrows keys 121, 122, 123 and 124 of the key pad 120 so as to select a frame to be edited.

For example, when the cursor is moved to "SKPS" and the "Execute" key 127 is pushed, it is possible to designate non-displayed frame (Skip designation command).

For example, in order to designate a frame of frame number 1 (No.1 frame) as a non-regenerated frame in the skip designation command, the user selects the No.1 frame and pushes "UP" key 125, so that a letter "SKIP" is displayed on the No.1 frame. Then, the user pushes the "Execute" key 127. As a result, data is stored in a storage region for the No.1 frame of the display buffer M2. The data indicates that the screen for the No.1 is to be cleared (the screen is to be one color). Also, data indicating the No.1 frame to be non-regenerated is stored in the RAM 160A of the CPU 160.

Incidentally, the image data of the No.1 frame is still stored in the CCD buffer M1. If the "VIEW" command is selected by operating the "DOWN" key 126, a letter "VIEW" is displayed on the No.1 frame. Then, the user pushes the "Execute" key 127, so that the image of No.1 frame is transmitted from the CCD buffer M1 to a storage region for the No.1 frame of the display buffer M2. As a result, frames are displayed, and also, data indicating the No.1 frame to be non-regenerated in the RAM 160A is deleted. The designation of the frame to be displayed/non-regenerate is carried out as above-mentioned way. Moreover, the designation is also canceled by operating the "Cancel" key 128.

Next, an explanation will be given of the designation of the length and breadth (top, bottom, right and left) of a frame.

In this case, the cursor is moved to "ROTS" and the "Execute" key 127 is pushed, then, it is possible to designate the length and breadth of a frame (Length and breadth command).

Figures 8A, 8B:
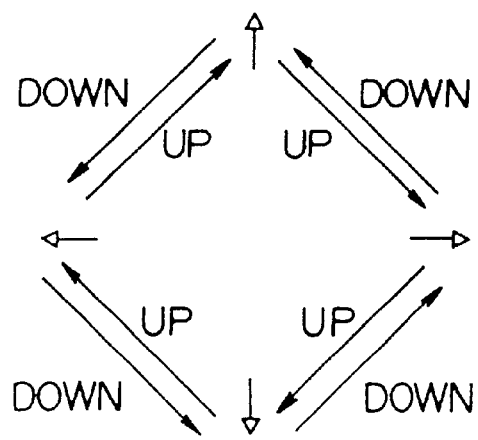
FIG. 8(A) and 8(B) is a view explaining the designation for the length and breadth of a frame on the index image.

When the length and breadth command is selected, a frame number of a frame to be edited blinks as shown in FIG. 8(A) and FIG. 8(B), and an arrow ↑ is displayed on the image of the frame. This arrow points to the top of the frame. The arrow is rotated clockwise by 90° every time the "UP" key 125 is pushed once, and the arrow is rotated counter-clockwise by 90° every time the "DOWN" key 126 is pushed once. When the arrow is set in the same direction as a correct image and the "Execute" key 127 is pushed, the image data in the storage region of the frame in the display buffer M2 are rotated in accordance with the set direction. Incidentally, the number of picture elements in the length and breadth of one frame is different as shown in FIG. 7, so the image is contracted when the image data are rotated from the length to the breadth, and the image is magnified when the image data is rotated from the breadth to the length.

Next, an explanation will be given of the designation of a print number for each frame. In this case, the cursor is moved to "PSET" and the "Execute" key 127 is pushed, then, it is possible to designate the print number for each frame (Print number designation command).

When the print number designation command is selected, a frame number, which is a frame to be edited, blinks as shown in FIG. 9, and a print number for the frame is displayed on the image of the frame. The print number is previously decided to be displayed "0". The number is increased by "1" every time the "UP" key 125 is pushed once, and the number is decreased by "1" every time the "DOWN" key 126 is pushed once. After the designation of the print number in the above-mentioned way and the "Execute" key 127 is pushed, the displayed number is set as the print number. Then, data indicating the print number is stored in RAM 160A of the CPU 160.

Moreover, each frame can be designated with regard to a print format corresponding to a ratio of the length to the breadth, which indicates one type of a high-vision image, a panoramic image or an ordinary image. In this case, the ratio of the length to the breadth is changed in accordance with the print format, so that the designated print format can be confirmed on the index image. Further, it is possible to designate a method of switching one frame to another frame on the screen. For example, one frame is switched to another frame immediately, one is switched to another by a scroll-in/out, fade-in/out, overlap and etc. on the index image.

After carrying out the editing on the index image in the above-mentioned way, the user moves the cursor to "END" and pushes the "Execute" key 127.

When the editing on the index image is completed, it is selected whether or not the editing is carried out for each frame (Step 206). This selection can be performed on the TV monitor 109 with operating the key pad 120.

Next, an explanation will be given of the case that the editing for each frame is carried out.

First, a displayed frame number is set at "1" (Step 208), and then the film 114 is transported by one frame in the forward direction at a speed of 9.25 mm/s, so that the scanning (main scanning) is carried out for the frame of frame number "1" (Step 210). During the main scanning, the CCD buffer M1 picks up the image data by means of the CCD line sensor 142.

When the image data are picked up, the CPU 160 adjusts the image data of each frame in accordance with the AE data, the AWB data, etc., which are stored in the RAM 121, so that the high-quality image data can be picked up regardless of the photographing conditions of each frame. 512×896 is the number of picture elements in one frame picked up by the CCD buffer M1 as shown in FIG. 6(D). Here, half of the CCD output from the CCD line sensor 142 (1024 picture elements) is thinned out at the time of the main scanning, so that the number of picture elements in the direction perpendicular to the film feed direction of one frame is 512. Further, the film transport speed is set to be ⅛ compared to the speed in the case when the image data of the index image are picked up, so that the number of picture elements in the direction perpendicular to the film feed direction of one frame is 896, which is eight times as large as that of picture elements (112) in the same direction as the film transport direction of one frame of the index image.

The CCD buffer M1 picks up the image data of one frame as described above, and transfers the data to the display buffer M2. The contents stored in the display buffer M2 are repeatedly read out, so that the image of one frame can be displayed on the TV monitor 109.

Figure 10:
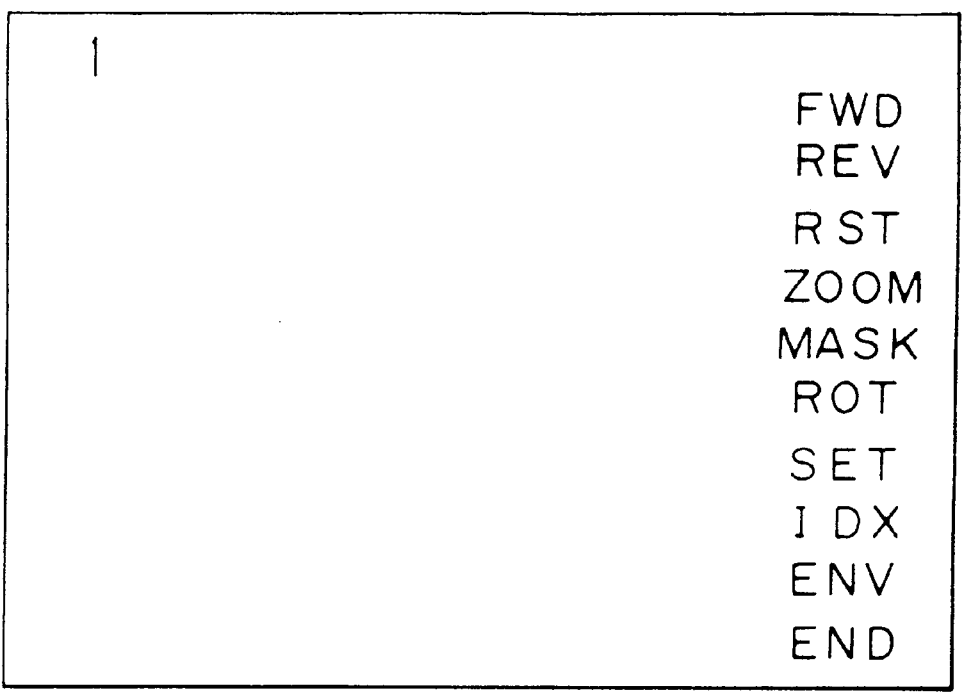
FIG. 10 is a view showing one example of the monitor screen in the case that the mode is set to designate the regeneration of one frame.

Incidentally, in the case that the mode is set to designate the regeneration of one frame, as shown in FIG. 10, the frame number is displayed at the upper left on the screen of the TV monitor, and letters of a command necessary for the editing of one frame are displayed at the right side on the screen of the TV monitor 109. Incidentally, "FWD" means to regenerate the next frame, "REV" means to regenerate the previous frame, "RST" means to reset each designation and carry out the re-scanning, "ZOOM" means to designate a zooming, "MASK" means to designate a mask, "ROT" means to designate the length and breadth of a frame, "SET" means to designate the print number, etc., "IDX" means to display the index image, "ENV" means to designate an environment such as interval time, a background color, etc., and "END" means to complete the editing for the image of one frame.

As described above, the command is selected by moving the cursor with the "UP" and "DOWN" keys 125 and 126 and pushing the "Execute" key 127.

For example, when the cursor is moved to "ZOOM" and the "Execute" key 127 is pushed, the command is the designation of the zooming (Step 212). In this command, a pointer is moved so as to designate the center of the zooming by operating the arrow keys 121, 122, 123 and 124 of the key pad 120. Then, the zooming-up or the zooming-out is carried out by means of electric zooming through the operation of the "UP" key 125 or the "DOWN" key 126. After the completion of the zooming, "Execute" key 127 is pushed, so that the zoom is designated and the designated data is stored in the RAM 160A of the CPU 160 (Step 214).

Here, supposing that the zooming can be performed in the range from a half times (0.5) to one and a half times (1.5) at the above-mentioned electric zooming, the image data can be triple-zoomed (three (3) times) at the maximum. That is, in the case that the magnification of the electric zooming is 1.5 times, and the zooming-up is designated with the "UP" key, the main scanning is carried out at a low speed. In this case, the film 114 is transported in the forward direction at a speed of 4.63 mm/s (½ of the ordinary main scanning), and the CCD output of the CCD line sensor 142 around the center of the zooming is picked up without being thinned out. As a result, the image data are double-zoomed compared to the data at the ordinary main scanning and picked up. Then, the image data is electrically zoomed, so that is can be triple-zoomed at the maximum.

Moreover, a title is displayed on the image of the frame with the operation of the key pad 120 (Step 218, 220). The data for letters of the title is stored in the RAM 160A of the CPU 160. Further, the cursor is moved to the "MASK" and the "Execute" key 127 is pushed, so that the command "MASK" is selected. In this command, a size and a position of the mask can be designated for the displayed frame (Step 224, 226).

After the display frames are edited, the cursor is moved to "END" and the "Execute" key 127 is pushed, so that the editing for the displayed frames is completed (step 234). On the other hand, in the case that the cursor is moved to "FWD" or "REV" and the "Execute" key 127 is pushed, the frame number is increased or decreased by one (step 236), so that the operation returns to the step 210. As a result, the editing for the other frames can be carried out in the same way as mentioned above.

When the editing of the display frames is completed (step 234), the film 114 is transported in the backward direction at a high speed of 148.0 mm/s as shown in FIG. 5. During the transport of the film, the data is stored again in the magnetic record layer 114B of the film 114, (Step 238) which are the data stored in the RAM 121 of the CPU 160, the one indicating designation in the edit with the index image, and the indicating designation in the edit with the displayed frame and the like. After this backward transport, the film cartridge is ejected (Step 240).

In the case that the edit for the displayed frame is not carried out in the Step 206, the operation proceeds to the Steps 242, 244. Then, the data is written in the magnetic layer 114B of the film 114, and the film cartridge is ejected just as in the Steps 238, 240.

As has been described above, the automatic regenerating information is designated by operating the key pad 120. However, this invention is not limited to this.

Regarding the part of the automatic regenerating information can be automatically designated by selecting an automatic designation.

As has been mentioned above, the magnetic recording and regenerating device 182 of the film player 100 can read out the magnetic information recorded in the magnetic layer 114 of the film 114. Among the information read by the device 182, the magnetic information relating to a print format, date and time, a top-bottom and left-right of an image on the film, a subject distance, a position of a main subject in one frame and the like are magnetically recorded by a magnetic head included in a camera at the time of photographing.

Accordingly, the magnetic information recorded by the camera is read out by the film player 100, so that following automatic regenerating information can be automatically designated in accordance with the magnetic information. That is, 1) In the case that the magnetic information is "Top-Bottom and Right-Left of the film image".
Automatic regenerating information relating to "length and breadth" is automatically designated from magnetic information relating to "Top-Bottom and Right-Left of the film image".
This automatic regenerating information instructs to display the subject of the film image on the TV monitor in a correct orientation, and to change the magnification in order to regenerate the film image on whole screen of the TV monitor.

2) In the case that the magnetic information is "Date and Time at Photographing of the film image".
Automatic regenerating information relating to "Switching screen" is automatically designated from magnetic information relating to "Date and Time at photographing".
This automatic regenerating information instructs that the switching of a scene on the screen is to be faded in/out in the case that a one frame is photographed after predetermined days from the photographing of a previous frame.
Automatic regenerating information relating to "Title of the film image" is automatically designated from magnetic information relating to "Date and Time at photographing".
This automatic regenerating information instructs to read out the title for a notional holiday, a date of a specific event, etc. in accordance with the photographing date (which is the specific date corresponding to the above event) and to display the title.
Moreover, this information instructs to read out the title for a private event (a wedding anniversary, a birthday, etc.) in accordance with the photographing date (which is the specific date corresponding to the above event) and to display the title (In this case, information relating to the title for private event should be previously recorded.).
Automatic regenerating information relating to "Sound for the film image" is automatically designated from magnetic information relating to "Date and Time at photographing".
This automatic regenerating information instructs to read out predetermined data for sound corresponding the photographing date and to play the sound at the time of regenerating.

3) In the case that the magnetic information is "Size of Main Subject of the film image (subject distance and focal length of the photographing lens)".
Automatic regenerating information relating to "Automatic Zooming" is automatically designated from magnetic information relating to "Size of Main Subject".
This automatic regenerating information instructs to set information including an instruction of magnification at a start of electronic zooming, that at an end of zooming, a zooming time is automatically designated in the case that the size of a main subject is smaller than the predetermined value (An user can easily watch a face of people at this value).
Automatic regenerating information relating to "Automatic closeup" is automatically designated from magnetic information relating to "Size of Main Subject".
This automatic regenerating information instructs that the image on the TV monitor is electronically closed up in a predetermined size in the case that the size of a main subject is smaller than the predetermined value.

4) In the case that the magnetic information is "Position of Main Subject of the film image".
Automatic regenerating information relating to "Center of Automatic Zooming" is automatically designated from magnetic information relating to "Position of Main Subject".
This automatic regenerating information is used as information relating to a center of the electronic zooming.
Automatic regenerating information relating to "Center of Automatic close up" is automatically designated from magnetic information relating to "Position of Main Subject".
This automatic regenerating information is used as information relating to the center of the electronic close up.

5) In the case that the magnetic information is "Print Format".

Automatic regenerating information relating, to "Movement in Screen" is automatically designated from magnetic information relating to "Print Format".

This automatic regenerating information instructs that a whole film image is displayed, then an enlargement, a panning and a tilting are carried out in the case that the print format indicates a panoramic image.

Automatic regenerating information relating to "Screen Display" is automatically designated from magnetic information relating to "Print Format".

This automatic regenerating information designates magnification and a range of an image to be regenerated on the TV monitor.

6) In the case that the magnetic information is "Print Number".

Automatic regenerating information relating to "Screen Display" is also automatically designated from magnetic information relating to "Print Number".

This automatic regenerating information instructs to automatically regenerate only film images which is instructed to be printed and the print numbers (the print number can be regenerated at the same time.).

Incidentally, a relationship between the photographing date and time and the title information and the sound information is stored beforehand in a memory within the film player 100.

As has mentioned above, the automatic regeneration can be performed effectively with these automatic regenerating information, and these information can be automatically designated.

The film player 100 can read the print format, etc. which is optically recorded in an area of the film 114 except the frame area by the optical data reading apparatus 180. The optical information is not limited to what is recorded by the camera, but includes what is recorded in the film except the frame area when the film cartridge is shipped by the manufacturer of the film. This optical information includes a print format indicating a panoramic photographing. The optical information is optically recorded on the film within a film cartridge which is set in, for example, a film with a lens exclusively for a panoramic photographing, and the like.

The automatic regenerating information in the table 1 which is used for performing the automatic regeneration effectively is not limited to the magnetic information recorded by the camera. As the automatic regenerating information, it is also possible to use the magnetic information relating to the photographing date and time, the size of a main subject, a position of a main subject, a print format, etc., which is recorded by a film player, etc. after photographing.

Figure 4:
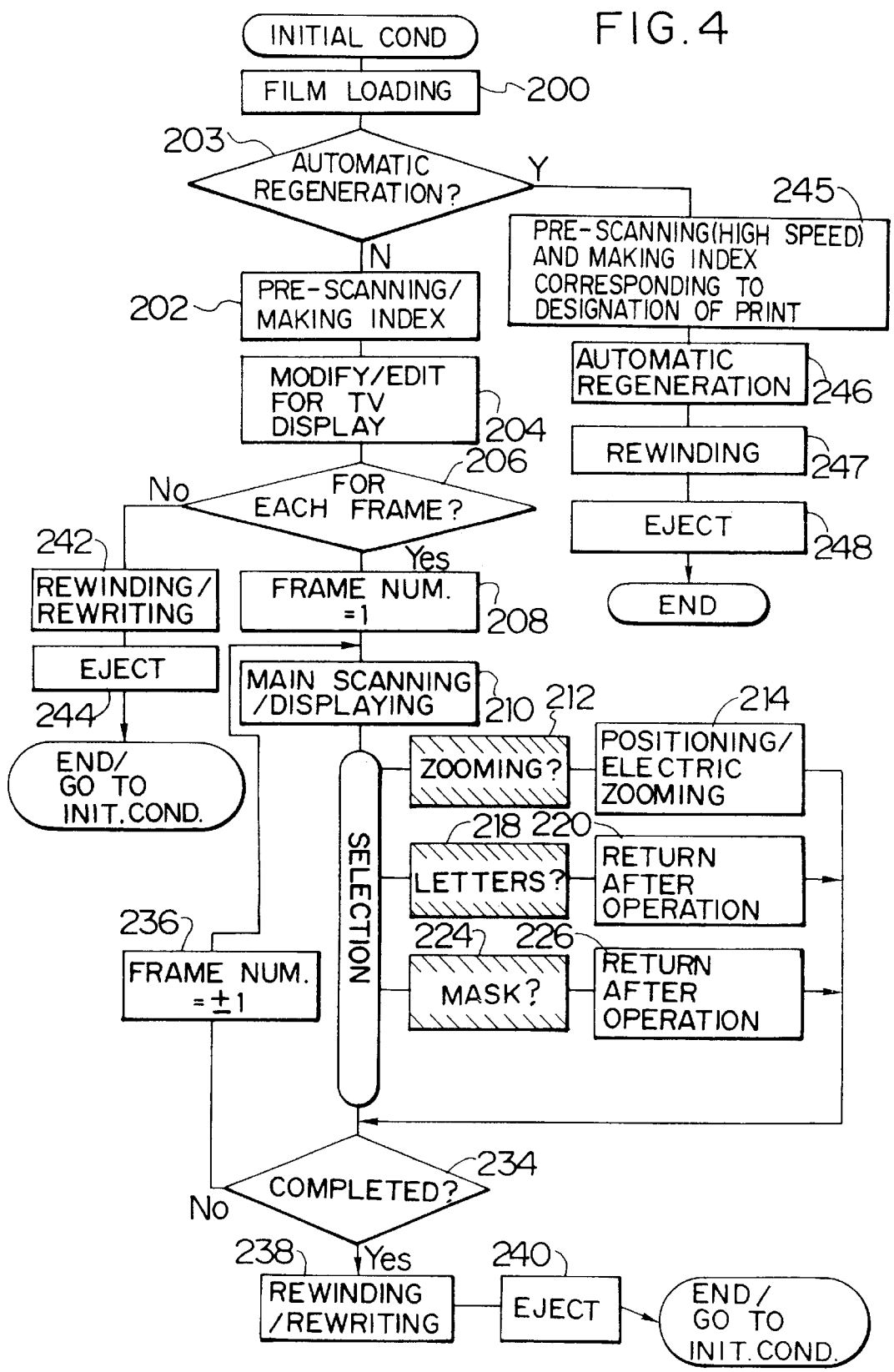
FIG. 4 is a flow chart explaining the operation of the film player of FIG. 1.

When the automatic regenerating information for sequentially and automatically regenerating the plural film images is automatically set or manually input and the automatic regeneration is selected in the step 203 of FIG. 4, the index image corresponding to the printing instruction is displayed. (Step 245).

Figure 11:
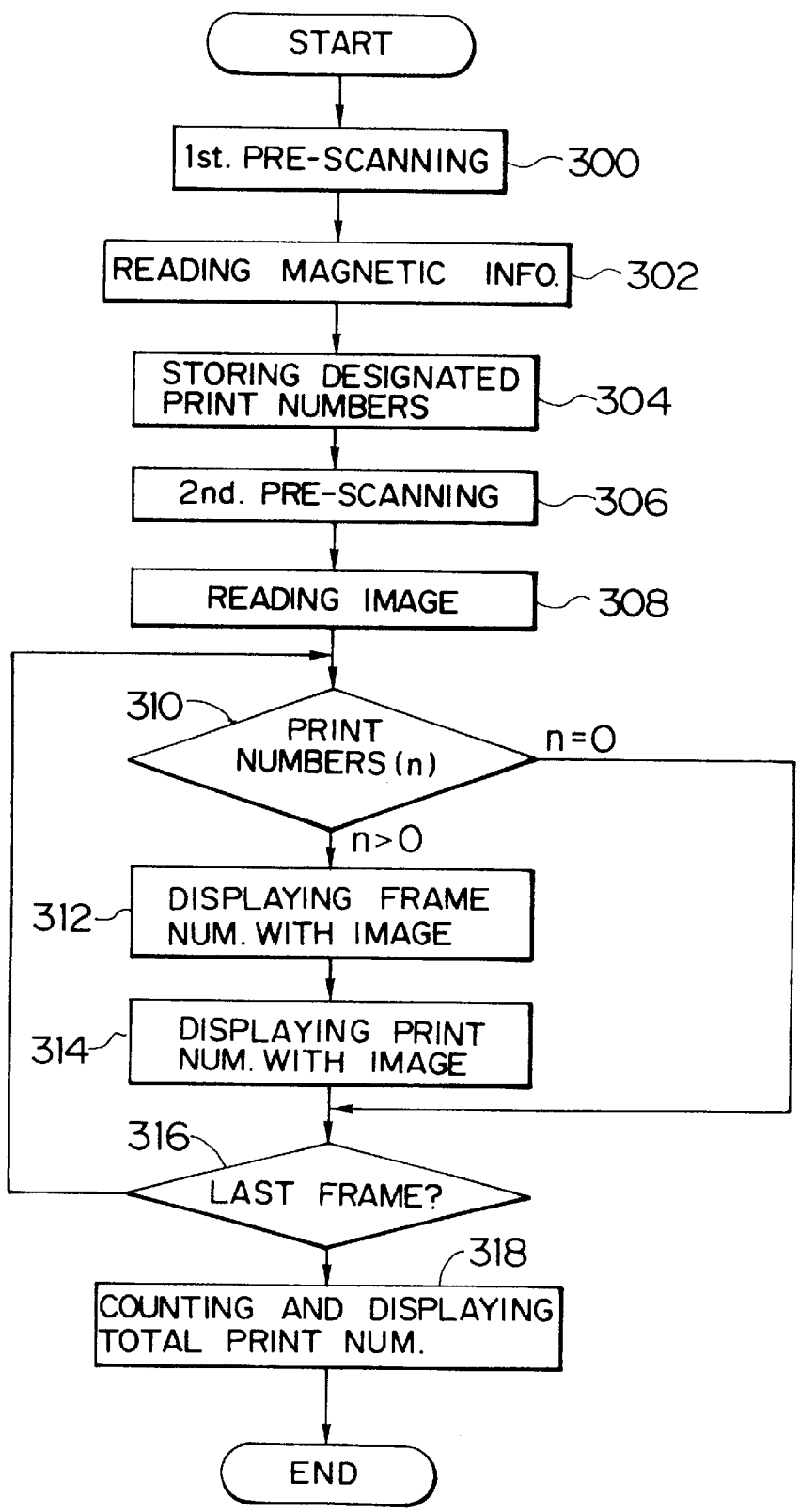
FIG. 11 is a flow chart showing a procedure for displaying an index image corresponding a printing instruction.

That is, as shown in the flow chart of FIG. 11, the first pre-scanning is carried out (Step 300). Then, the magnetic information including the number of prints (print number) for each frame instructed to be printed is read from the film. After this, the print number for each frame instructed to be printed, etc. are memorized (Steps 302 and 304).

Next, the second pre-scanning is carried out (Step 306), and information relating to each of film images on a roll of film is read out (Step 308). Incidentally, the first and second pre-scanning were explained by FIG. 5, etc., so an explanation of them is omitted here.

Then, it is judged whether the print number for each frame (n) is 0 or not. When (n) is more than 0, the frame number as well as the film image of the frame is displayed at a predetermined position in the index image as shown in FIG. 12 (Step 312). Further, the number of prints for the frame is displayed together with the film image (Step 314), and the operation proceeds to the step 316. On the other hand, in the step 310, when (n) is 0, the film image, etc. of the frame are not displayed, and the operation proceeds to the step 316.

In the step 316, it is judged whether the subject frame is a final frame or not (Step 316). When the frame is not a final frame, a frame of the next frame number is a subject frame and the operation returns to the step 310, and the above-mentioned processing is repeated.

When it is judged that the subject frame is the final frame in the step 316, the total number of the prints is calculated, and the total number is displayed at a predetermined position.

As a result, if the number of prints is instructed for the film as shown in FIG. 9, the display of the film image which is not instructed to be printed is cancelled as shown in FIG. 12, and only the frame image which is instructed to be printed is displayed. The display of the index image is ideal for the case when the film which is instructed to be printed by the film player is delivered to a development agency, and the frame which is instructed to be printed and the number of prints, etc. are reviewed at the development agency.

Figure 13:
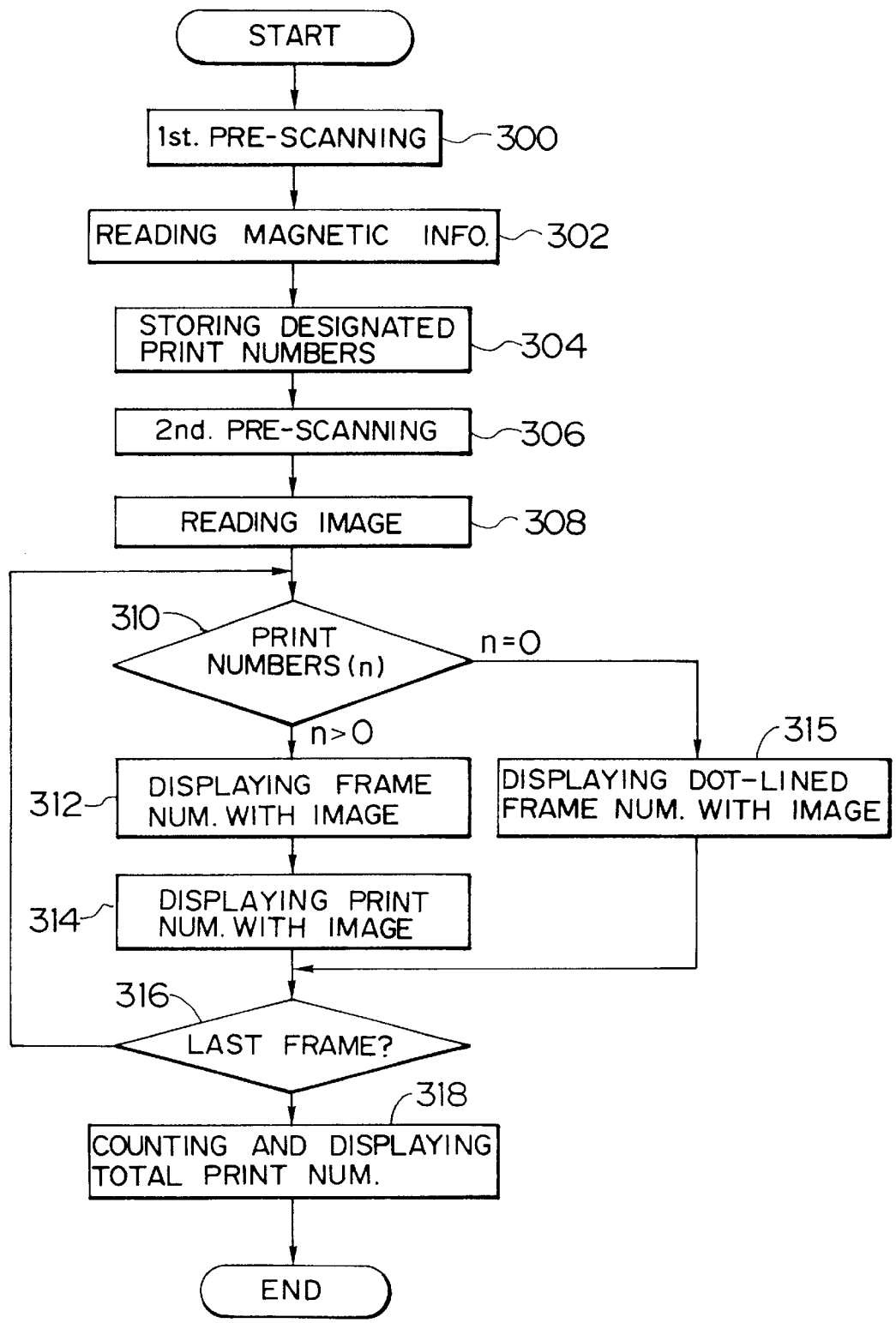
FIG. 13 is a flow chart showing a procedure for displaying the other index image corresponding to a printing instruction.

FIG. 13 is a flow chart in the case when the index image corresponding a printing instruction is displayed in the other way. Incidentally, the same marks are put on the same steps as FIG. 11, and an explanation of them is omitted here.

When the flow charts in FIG. 11 and FIG. 13 are compared with each other, two flow charts are different from each other in that when the number of prints (n) is 0 in the step 310, the processing of the step 315 is carried out so that the operation proceeds to the step 316 in FIG. 13.

In the step 315, the frame number of the frame image which is not instructed to be printed is displayed with a dot line as shown in FIG. 14, so that the frame image can be distinguished from the frame image which is instructed to be printed. Incidentally, a method of displaying the frame image, which is instructed to be printed, and the frame image, which is not instructed to be printed, is not limited to the above-mentioned mode in order the they can be distinguished from each other. There are, for example, a method of displaying the frame image in such a manner that the forms of a character of a frame number are to be different, a method of changing a color and a brightness of a frame number, method of changing a color of the frame image (the image which is not instructed to be printed is displayed in black and white), a method of changing a brightness of the frame image (a method of lowering the brightness of the frame image of the frame image which is not instructed to be printed), and the like.

Figure 15:
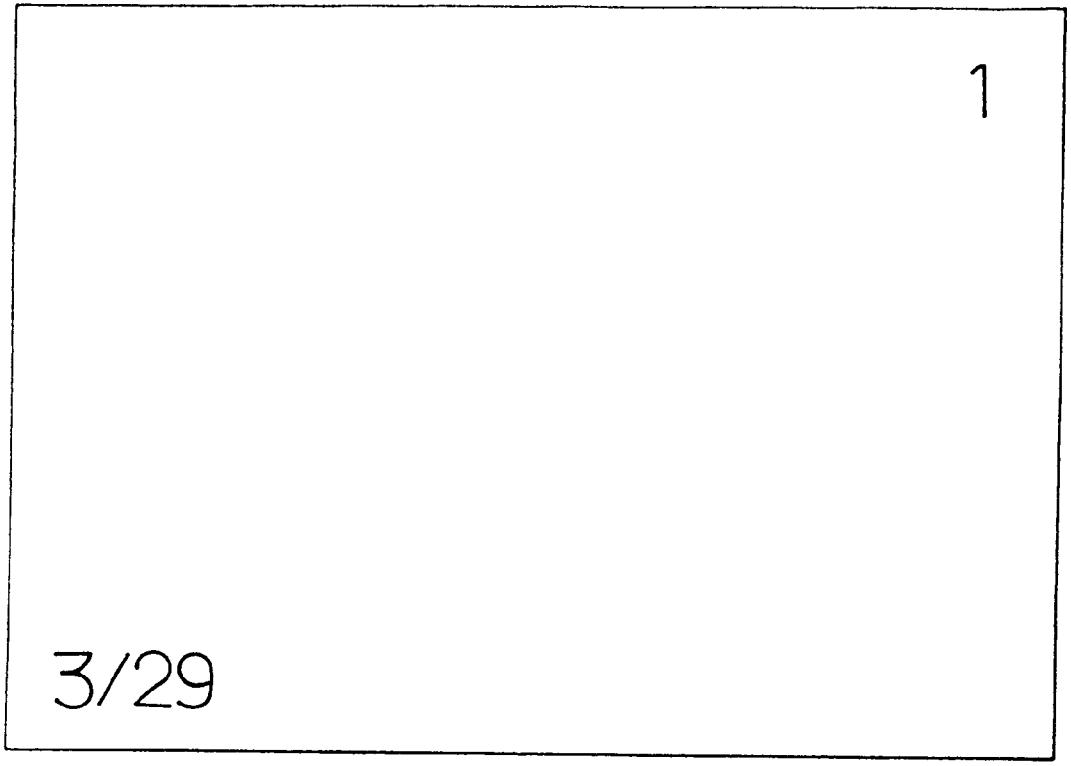
FIG. 15 is a view showing a monitor screen displayed when a frame image corresponding to a printing instruction is automatically regenerated.
Figure 16:
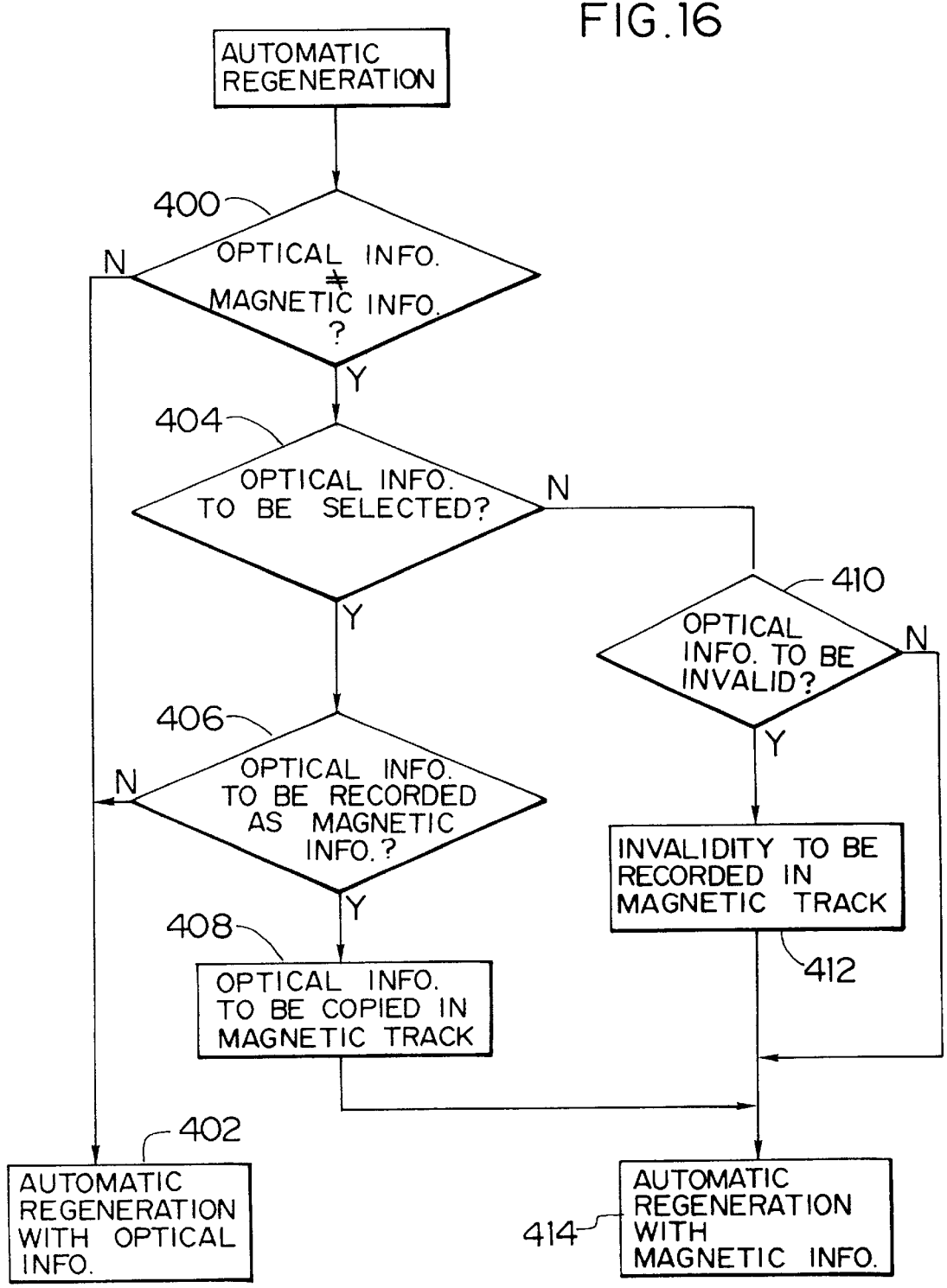
FIG. 16 is a flow chart showing a procedure when an automatic regeneration is carried out in accordance with optical information or magnetic information.

Next, when the automatic regeneration of the frame image corresponding to the printing instruction is selected after the above-mentioned index image is displayed, only the frame image, which is instructed to be printed, among a plurality of the film images within one roll of film, is regenerated sequentially and automatically one by one (Step 246). In this case, as shown in FIG. 15, the frame number is displayed at the top left, and the number of prints/the total number of prints for the frame image are displayed at the bottom left.

Next, an explanation will hereunder be given of the case when a plurality of the film images within one roll of film are sequentially and automatically regenerated in accordance with the above-mentioned automatic regenerating information.

In this case, the optical information and the magnetic information, which are read by the first pre-scanning to be separately stored in a RAM 160A within the CPU 160, are compared with each other (Step 400). Then, when the optical information and the magnetic information corresponds to each other, the automatic regeneration is carried out in accordance with the optical information stored in the RAM 160A. Incidentally, the optical information and the magnetic information corresponds to each other in this case, so the automatic regeneration may be carried out in accordance with the magnetic information stored in the RAM 160A.

On the other hand, if the optical information and the magnetic information do not correspond to each other (the case when one of the optical information and the magnetic information is missing, is included here), it is judged whether or not the optical information is selected in accordance with a selection by a mode selecting means (not shown in the drawing), which selects one of the optical information and the magnetic information. Then, when the optical information is selected, it is judged whether or not the indication of the optical information is recorded as magnetic information in accordance with an operation of a convert instructing means (not shown in the drawing), which instructs to record the indication of the optical information as magnetic information (Step 406).

When it is judged that the indication of the optical information is not recorded as magnetic information, the operation proceeds to the step 402, and the automatic regeneration is carried out in accordance with the optical information. On the other hand, when the indication of the optical information is recorded as magnetic information, the optical information is stored as the magnetic information in the RAM 160A (Step 408). For example, if the optical information relates to a print format indicating a panorama photographing and the magnetic information is a print format indicating a high-vision, the magnetic information is rewritten into the print format indicating the panorama. If the magnetic information has no information corresponding to the optical information, the optical information is added to the RAM 160A as the magnetic information. Then, the automatic regeneration is carried out in accordance with the magnetic information stored in the RAM 160A (Step 414).

Furthermore, when the optical information is not selected in the step 404, it is judged whether the optical information is invalidated or not in accordance with an operation of an invalidity instructing means (not shown in the drawing), which invalidates the optical information. When the invalidation of the optical information is instructed, the magnetic information for invalidating the optical information as the automatic regenerating information is stored in the RAM 160A (Step 412). Then, the automatic regeneration is carried out in accordance with the magnetic information (Step 414). On the other hand, when the invalidation of the optical information is not instructed, the operation proceeds to the step 414 so that the automatic regeneration is carried out in accordance with the magnetic information.

The automatic regeneration which is based on the magnetic information or the optical information is completed in the above-mentioned way. Then, the magnetic information stored in the RAM 160A is recorded again in the magnetic record layer 114B of the film 114 (Step 247) when the film is rewound as shown in FIG. 4. After the rewinding is completed, the film cartridge 110 is taken out (Step 248). Once the automatic regenerating information is recorded in the magnetic record layer of the film in the above-mentioned way, the automatic regeneration can be carried out in accordance with the automatic regenerating information by reading the automatic regenerating information at the time of pre-scanning.

As has been described above, according to the film image automatic regenerating method of the present invention, the magnetic information and the optical information which are recorded in the film by the camera at the time of photographing, or the optical information which is recorded in the film when the film is shipped by the manufacturer are used as a part of the automatic regenerating information, so that the automatic regenerating information can be easily input. Moreover, even if the magnetic information and the optical information which are recorded in the film are different from each other, a predetermined automatic regeneration which corresponds to the selection by the user can be realized. Furthermore, the film image which is instructed to be printed and the number of prints, etc. among the plural frame images within one roll of film can be easily reviewed on the index image or the automatically regenerated image on the TV monitor.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic regenerating method for a film image, wherein a developed photographic film is transported to an image reader, the film includes a plurality of film images and a magnetic layer, the plurality of film images of the film are read out, and the read-out film images are displayed on a display in accordance with automatic regenerating information used for sequentially and automatically regenerating the plurality of film images, the method comprising the steps of:

recording magnetic information relating to at least one of a photographing date/time, a size of a main subject, a position of a main subject, and a print format in the magnetic layer during a time of photographing;

using the magnetic information as the automatic regenerating information in order to perform an automatic regeneration effectively;

detecting an interval of photographing date and time between adjacent film images from said magnetic information relating to the photographing date/time;

comparing the interval and a predetermined value;

performing a switching of a scene between adjacent film images on the display in accordance with a first switching mode when the interval is larger than the predetermined value; and performing a switching of a scene between adjacent film images on the display in accordance with a second switching mode when the interval is smaller than the predetermined value.

2. An automatic regenerating method for a film image, wherein a developed photographic film is transported to an image reader, the film includes a plurality of film images and a magnetic layer, the plurality of film images of the film are read out, and the read-out film images are displayed on a display in accordance with automatic regenerating information used for sequentially and automatically regenerating the plurality of film images, the method comprising the steps of:

recording magnetic information relating to at least one of a photographing date/time, a size of a main subject, a position of a main subject, and a print format in the magnetic layer during a time of photographing;

using the magnetic information as the automatic regenerating information in order to perform an automatic regeneration effectively;

detecting a specific date from said magnetic information relating to the photographing date/time;

reading out title information and/or sound information, the title information and/or the sound information being previously stored in such a manner to correspond to the specific date; and automatically regenerating the film image on the display together with the title and/or the sound in accordance with the title information and/or the sound information.

3. An automatic regenerating method for a film image, wherein a developed photographic film coated with a magnetic layer is transported to an image reader, a film image of the film is read out, and the read-out film image is displayed on a display, the method comprising the steps of:

recording magnetic information on said magnetic layer, indicating a central position of zooming, to represent a zoom reference point for when a regenerated image is zoomed; and zooming said regenerated image continuously based on the central position of zooming indicated by said magnetic information.

4. An automatic regenerating method for a film image, wherein a developed photographic film is transported to an image reader, the film including a magnetic layer, a film image of the film is read out, and the read-out film images are displayed on a display, the method comprising the steps of:

(a) recording, on said magnetic layer, magnetic information indicating a print format for a film image;

(b) detecting a film image representing a panoramic image from said magnetic information indicating the print format;

(c) showing, on a display, the whole film image representing the panoramic image; and (d) enlarging the film image representing the panoramic image, and scrolling the enlarged film image horizontally or vertically;

wherein said step (c) is executed followed by said step (d), or said step (d) is executed followed by said step (c) when the film image to be shown on said display is detected as being a panoramic image.

5. An automatic regenerating method for a film image wherein a developed photographic film is transported to an image reader, the film includes a plurality of film images and a magnetic layer, the plurality of film images of the film are read out, and the read-out film images are displayed on a display in accordance with automatic regenerating information used for sequentially and automatically regenerating the plurality of film images, the method comprising the steps of:

reading magnetically stored automatic regenerating information from the magnetic layer as magnetic information, said magnetic information having been recorded either during photographing or during subsequent editing;

reading optically stored automatic regenerating information from a photographic film area as optical information, said optical information having been recorded during photographing;

determining whether the optical information is consistent with the magnetic information;

selecting one of the magnetic information and the optical information by a mode selecting means when said determining step indicates that the optical information is inconsistent with the magnetic information, the mode selecting means selecting one of the magnetic information and the optical information in accordance with an instruction; and using only information selected by the mode selecting means as the automatic regenerating information at a time of regenerating.

6. An automatic regenerating method for a film image wherein a developed photographic film is transported to an image reader, the film includes a plurality of film images and a magnetic layer, the plurality of film images of the film are read out, and the read-out film images are displayed on a display in accordance with automatic regenerating information used for sequentially and automatically regenerating the plurality of film images, the method comprising the steps of:

reading magnetically stored automatic regenerating information from the magnetic layer as magnetic information, said magnetic information having been recorded either during photographing or during subsequent editing;

reading optically stored automatic regenerating information in a photographic film area as optical information, said optical information having been recorded during photographing;

determining whether the optical information is consistent with the magnetic information;

selecting one of the optical information and the magnetic information as the automatic regenerating information when said determining step indicates that the magnetic and optical information are inconsistent;

invalidating the optical information in accordance with an instruction of an invalidity instructing means when said selecting step selects the magnetic information, the invalidated optical information not being used as the automatic regenerating information; and recording in the magnetic layer information indicating that the optical information is invalidated.

7. The automatic regenerating method for a film image according to claim 6 further comprising the steps of:

selecting one of the magnetic information and the optical information by a mode selecting means, the mode selecting means selecting one of the magnetic information and the optical information in accordance with an instruction; and recording information indicating that the optical information is invalidated when the magnetic information is selected by the mode selecting means and when the invalidity instructing means instructs to invalidate the optical information.

8. An automatic regenerating method for film image wherein a developed photographic film is transported to an image reader, the film includes a plurality of film images and a magnetic layer, the plurality of film images of the film are read out, and the read-out film images are displayed on a display in accordance with automatic regenerating information used for sequentially and automatically regenerating the plurality of film images, the method comprising the steps of:

reading magnetically stored automatic regenerating information from the magnetic layer as magnetic information;

reading optically stored automatic regenerating information in the photographic film outside a frame area as optical information;

determining whether the magnetic information is consistent with the optical information;

selecting one of the optical information and the magnetic information when said determining step indicates that the magnetic information is inconsistent with the optical information; and recording the optical information, after said selecting step selects the optical information, as the magnetic information in accordance with an instruction to record the optical information as the magnetic information in the magnetic layer of the film.

9. The automatic regenerating method for a film image according to claim 8 further comprising the steps of:

selecting one of the magnetic information and the optical information by a mode selecting means, the mode selecting means selecting one of the magnetic information and the optical information in accordance with an instruction; and recording the optical information in the magnetic layer as the magnetic information when the optical information is selected by the mode selecting means and the convert instructing means instructs to record the indication of the optical information as magnetic information in the magnetic layer of the film.

10. An automatic regenerating method for film images in which developed photographic film, including a plurality of film images and a magnetic layer, is transported to an image reading part, the plurality of film images of the film are read out, and the read out film images are displayed on a display in accordance with automatic regenerating information used for sequentially and automatically regenerating the plurality of film images, the method comprising:

reading out print information from the magnetic layer of the film, the print information having been previously recorded in the magnetic layer of the film, and the print information instructing which film images are to be printed; and automatically regenerating only the film images which are instructed to be printed in accordance with the print information during each of a plurality of successive film image regenerating sessions.

11. The automatic regenerating method for a film image according to claim 10, wherein the print information includes information relating to a print number, and further comprising the step of:

automatically regenerating the print number together with said film image being instructed to be printed.

12. The automatic regenerating method for a film image according to claim 10, wherein the print information includes information relating to a print number, and further comprises the step of:

calculating and displaying a total number of the print number for said film image instructed to be printed.

13. An automatic regenerating method for a film image, the method comprising the steps of:

transporting a developed photographic film to an image reader, the film including a plurality of film images and a magnetic layer;

reading out the plurality of film images of the film;

making an index image, the index image including a plurality of frames corresponding to the plurality of film images;

displaying the index image on a display;

reading out print information from the magnetic layer of the film, the print information being previously recorded in the magnetic layer of the film, and the print information instructing a film image to be printed; and displaying the index image in such a manner that frames of the index image for the film images being instructed to be printed and frames of the index image for film images not being instructed to be printed appear different from each other.

14. The automatic regenerating method for a film image according to claim 13, further comprising the step of:

making the index image in such a manner so as to distinguish each frame number and/or frame of the index image for the film image being instructed to be printed so that said frames of the index image for the film images being instructed to be printed and said frames of the index image for film images not being instructed to be printed appear different from each other.

15. The automatic regenerating method for a film image according to claim 13, further comprising the steps of:

not displaying said frames of the index image for film images not being instructed to be printed so that said frames of the index image for the film images being instructed to be printed and said frames of the index image for film images not being instructed to be printed appear different from each other.

16. The automatic regenerating method for a film image according to claim 13, wherein the print information includes information relating to a print number, and further comprising the steps of:

displaying a print number for said film image being instructed to be printed and/or a total number of the print number for said film image.

17. The method according to claim 3, wherein said magnetic information indicates the position of a main subject recorded by a camera during a time of photographing.

18. A method of recording information on photographic film coated with a magnetic layer, the method comprising the steps of:

recording a film image on said photographic film and recording optical information in a photographic film area during a time of photographing;

reading said optical information after said photographic film is developed;

determining whether the optical information is consistent with magnetic information stored on the magnetic film layer;

selecting one of the optical information and the magnetic information as automatic regenerating information when said determining step indicates that the magnetic and optical information are inconsistent; and recording the read optical information on the magnetic layer of said film in response to an instruction to record said optical information as the magnetic information when said selecting step selects the optical information as the automatic regenerating information.

19. The method according to claim 18, wherein said magnetic information is recorded on said magnetic layer by a camera during a time of photographing.

20. The method according to claim 18, wherein said magnetic information is recorded on said magnetic layer by an editing means after said photographic film is developed.

21. The method according to claim 19, wherein said magnetic information is recorded on said magnetic layer by an editing means after said photographic film is developed.

* * * * *